Aug. 14, 1923.  
J. ROCK  
1,465,058  
TOOL SUPPORTING SPINDLE FOR WOODWORKING MACHINES  
Filed Aug. 22, 1921
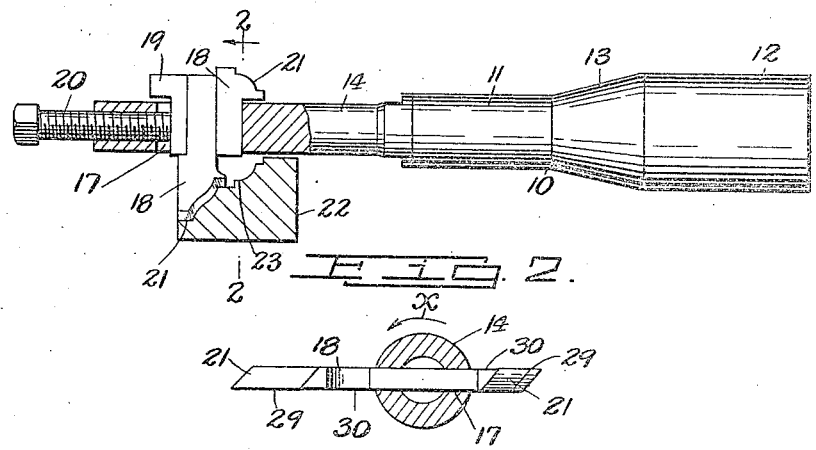
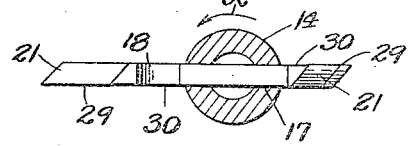
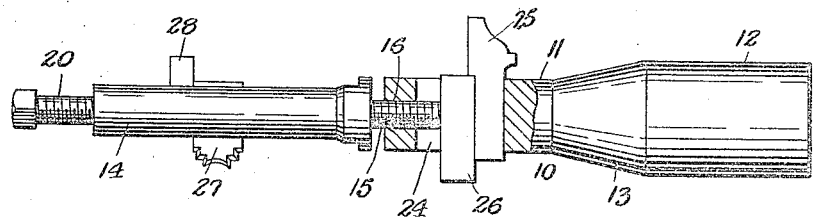
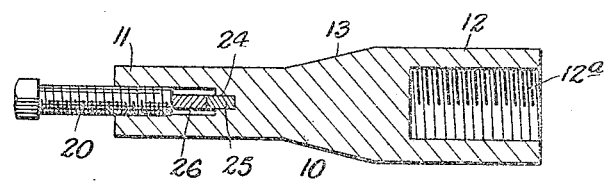
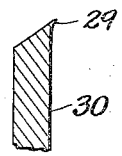
Inventor  
James Rock  
By his Attorneys  
Edgar Tate Co Patented Aug. 14, 1923.

1,465,058

UNITED STATES PATENT OFFICE.

JAMES ROCK, OF NEW YORK, N. Y.

TOOL-SUPPORTING SPINDLE FOR WOODWORKING MACHINES.

Application filed August 22, 1921. Serial No. 494,047.

*To all whom it may concern:*

Be it known that I, JAMES ROCK, a citizen of the United States, and residing at New York, in the county of New York and State of New York, have invented certain new and useful Improvements in Tool-Supporting Spindles for Woodworking Machines, of which the following is a specification, such as will enable those skilled in the art to which it appertains to make and use the same.

This invention relates to woodworking machines and particularly to the tool supporting spindles thereof, and the object of the invention is to provide an improved spindle of this class which is so constructed as to permit of the attachment of one or more cutter blades in connection therewith and for balancing said cutter blades; a further object being to provide a spindle of the class specified in connection with which one or more sets of blades may be mounted; a still further object being to provide the cutter blades employed in connection with my improved spindle with turned cutting edges which facilitate the operation thereof; and with these and other objects in view the invention consists in a tool supporting spindle of the class and for the purpose specified which is simple in construction and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of my improved spindle, part of the construction being broken away and in section and indicating the method of its use;

Fig. 2 a partial section on the line 2—2 of Fig. 1 on an enlarged scale;

Fig. 3 a view similar to Fig. 1 but showing a modification;

Fig. 4 a sectional view of a part of the construction shown in Fig. 3 and showing another use thereof; and, Fig. 5 a sectional detail view of a part of a cutter blade or tool showing the cutting edge thereof.

In Fig. 1 of the drawing I have shown at 10 a spindle of a woodworking machine and my improved spindle is designed primarily for use in connection with woodworking machines designed to produce molding strips and the like, and as shown in Fig. 1 the spindle is provided with a reduced central portion 11 joined with a larger end portion 12 by a tapered portion 13 and the other end portion 14 is reduced and either formed integral with the central portion 11, or may be detachably mounted in connection therewith by a screw 15 on the end portion 14 which operates in a threaded aperture 16 in the central portion 11 as shown in Fig. 3.

The end portion 14 of the spindle is provided with an elongated aperture 17 in which tools or cutter blades 18 and slugs 19 are adapted to be placed and held in position by a screw 20 passed inwardly through the reduced end portion 14, as clearly shown in Fig. 1.

In the construction shown in Fig. 1 two tools or cutter blades 18 are employed, and the cutting faces 21 thereof are extended in opposite directions, and the slug 19 is employed to properly balance the spindle, or to provide as near as possible the same amount of metal at the opposite sides of the spindle, and the operation of the spindle 10, or rotation thereof, by a suitable woodworking machine will cause the blades 18 to revolve and operate in connection with a workpiece 22 to cut grooves 23 therein, and thus produce a molding strip such as is indicated in section in Fig. 1. It will be understood that the contour of the molding strip will be governed by the shape of the cutting edges of the blades 18.

In Fig. 3 of the drawing, I have shown the central portion 11 of the spindle provided with a transverse elongated aperture 24 in which a tool or cutter blade 25 is mounted as well as a balance slug 26, and said tool and slug are held in position by the screw 15 of the end portion 14, as clearly shown in said figure, and a single tool or cutter blade 27 and balance slug 28 is shown supported in the aperture 17 instead of the cutter blades 18 and slug 19, as shown in Fig. 1.

In Fig. 4 of the drawing I have shown the central portion 11 and end portion 12 of the spindle 10, and I have also shown the tool 25 and slug 26 shown in Fig. 3 secured in the aperture 24 by means of the screw 20 as shown in Figs. 1 and 3. In other words, by removing the end portion 14 of the spindle the remaining portion of the spindle may be used for the purpose of cutting moldings strips, or the like, and in this use thereof the screw 20 is removed from the end portion 14 and used in the central portion 11 of said spindle as shown in Fig. 4.

In other words, I may provide a spindle of the class specified with one or more apertures, such as the apertures 17 and 24, which pass centrally through the axis of the spindle, and in which the tools or cutter blades are adapted to be mounted and rigidly supported by means of a suitable screw, and tools or cutter blades may be mounted in either or both of said apertures and used separately or collectively in the production of molding strips of various kinds and classes, and as shown in Fig. 4 the enlarged end portion 12 of the spindle is provided with a threaded aperture $12^a$ by means of which said spindle may be mounted in connection with its usual support in woodworking machines of the class under consideration.

The cutting edges of the tools or cutter blades 18, 25 and 27 are turned at a slight angle as shown at 29 in Fig. 5 of the drawing, and by reason of this method of forming the cutting edge of the tools, I produce a more perfect cutting tool of the class specified, and it will be understood that the entire cutting edge or edges of the tools or blades will be formed as shown in Fig. 5, and whenever necessary, or when the turned edge becomes worn through extensive use, the same may be resharpened by a suitable tool rubbed over the cutting edge or edges of the tool to again turn said cutting edge or edges at an angle as shown at 29 in Fig. 5.

I have found, in practice, that by reason of my improved method of mounting tools or cutter blades in connection with spindles, namely, the mounting thereof centrally of the axis of the spindle, the use of a straight or ordinary cutting edge on the tools or cutter blades employed would not produce satisfactory results, but by turning the edges of said tools or blades at a slight angle and in the direction of the plane face 30 thereof, said tools or blades will operate perfectly to produce the desired result, and it will be understood that the tools or blades 18, 25 and 27 are so mounted in connection with the spindle that the plane faces 30 thereof face the direction of rotation of said spindle as is clearly illustrated in Fig. 2 of the drawing, the direction of rotation of the spindle is indicated at $x$ in said figure.

It will be understood that while I have shown certain details of construction, and specific forms of tools or cutter blades that I am not necessarily limited to such details and various changes in and modifications of the construction herein shown and described, may be made, within the scope of the appended claims, without departing from the spirit of my invention or sacrificing its advantages.

Having fully described my invention, what I claim as new and desire to secure by Letters Patent, is:—

1. A tool supporting spindle of the class comprising a main spindle and a supplemental spindle, said main and supplemental spindles being provided with apertures extending transversely through the axis thereof and into which one or more tools and slugs are adapted to be placed, the tools and slugs in the main spindle being held in position by a threaded member on the supplemental spindle which passes into the aperture of the main spindle, and means adjustably mounted in the supplemental spindle and extending into the aperture thereof for holding the tools and slugs therein.

2. A tool of the class described comprising main and supplemental spindles provided with apertures which extend transversely through the axis thereof, the supplemental spindle being provided with a threaded member which is adapted to extend into the aperture of the main spindle for coupling said main and supplemental spindles together and for securing tools in the aperture of the main spindle, and a screw adjustably mounted in the supplemental spindle for supporting tools in the aperture thereof.

In testimony that I claim the foregoing as my invention I have signed my name in presence of the subscribing witnesses this 20th day of August 1921.

JAMES ROCK.

Witnesses:
C. E. MULREANY,
H. C. THOMPSON.